July 6, 1965 C. E. MINNICK 3,193,254
APPARATUS FOR GRIPPING AND PULLING
Filed June 15, 1962 2 Sheets-Sheet 1

CHARLES E. MINNICK
INVENTOR
HUEBNER & WORREL
ATTORNEYS
BY
Richard M. Worrel

July 6, 1965   C. E. MINNICK   3,193,254
APPARATUS FOR GRIPPING AND PULLING
Filed June 15, 1962   2 Sheets-Sheet 2
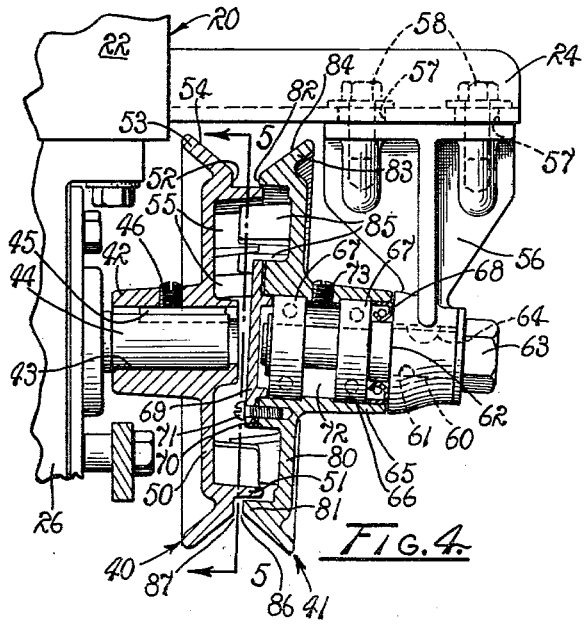
FIG. 4.
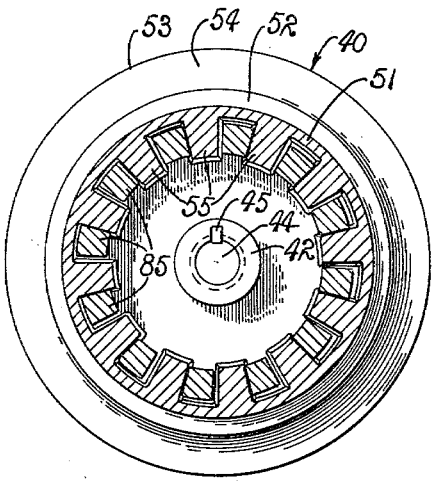
FIG. 5.
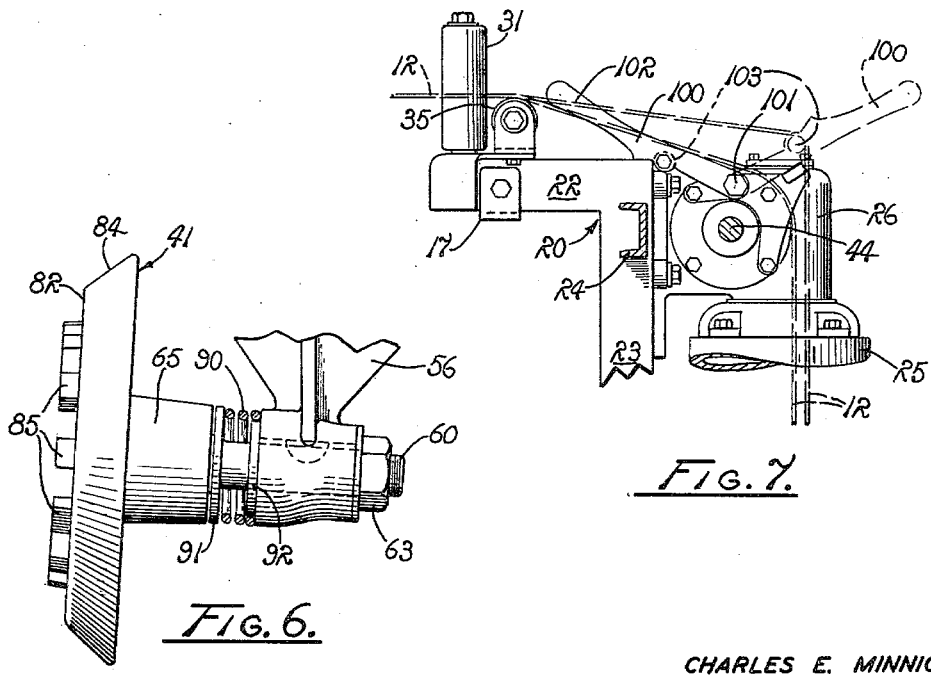
FIG. 6.
FIG. 7.
CHARLES E. MINNICK
INVENTOR
HUEBNER & WORREL
ATTORNEYS
BY
Richard M. Worrel United States Patent Office 3,193,254
Patented July 6, 1965

3,193,254
APPARATUS FOR GRIPPING AND PULLING
Charles E. Minnick, 1831 Thomas, Fresno, Calif.
Filed June 15, 1962, Ser. No. 202,883
3 Claims. (Cl. 254—150)

This invention relates to a device to grip and to exert a force in tension on an elongated article. It particularly relates to a pulling or retrieving device for flexible tension members, such as ropes, fishing lines, cables and the like, where it is not feasible or practical to use conventional winding mechanisms, such as winches or reels.

In certain environments, elongated flexible articles must be pulled or drawn toward a reference station and upon reaching a predetermined location relative to the reference station, the articles must be freed from the particular device employed to exert a pulling force. A specific example of such an environment is commercial deep-sea fishing for certain fish caught by using individual lines carrying respective hook-type lures. Prior to the present invention, fish, such as albacore, were caught on individual lines retrieved by hand. Various winding mechanisms have been tried without success.

The particular fishing apparatus used in catching albacore normally comprises a barbless hook lure, termed a "feathered jig" by commercial fishermen, and a two hundred pound test line secured to the lure. The lure is trailed behind a fishing boat during trolling, and no weight or float is attached the line.

Upon catching a fish on the lure of a given line, that line is retrieved and permitted to fall in a random pattern into a loose pile on the deck or bottom of the boat. Following the removal of the lure from the catch, the lure is dropped overboard, and the light drag resulting from the lure and the line in the water is depended upon to carry the lure a desired distance to the rear of the boat. Consequently, the previously retrieved portion of the line must be free to be pulled into the water and trail behind the boat. Little or no resistance must be offered to the returning line. Otherwise, the light drag resulting from the lure and the line in the water is insufficient to pull the line back into the water. Thus, the slight drag of such lures precludes the winding of the line on a reel or winch in the manner usual to heavy lures or lures of greater drag.

Conventional winches and other winding mechanisms of sufficient capacity to retrieve the line with a fish caught on the lure are of such a size and structure that a high resistance is offered to the trailing of the line back into the water. Also, the inertia of the winding drums does not permit the flexibility and ease of fishing operations required in the use of the above described fishing gear. According, prior to the present invention, a need has existed for a pulling device capable of retrieving the line used in catching large fish and yet permitting the line to be returned to the water without any resistance whatsoever other than its own weight and inertia.

While apparatus embodying the principles of the present invention is excellently suited for use in commercial fishing operations, other uses will become apparent from the description below.

Accordingly, it is an object of the present invention to provide a device to grip and to exert a force in tension on a line or the like and to release the line at any selected time during operation or any line position relative to the device.

Another object is to provide a device to grip, to transport and to release an article supplied thereto.

Another object is to provide a line pulling apparatus particularly suited for use in commercial fishing operations.

Another object is to provide apparatus for pulling elongated flexible tension members, such as ropes, fishing lines, and the like which is capable of pulling such members in either direction longitudinally thereof and is adapted to permit movement in a direction opposite to that in which it had been pulled while offering no resistance to such return movement.

Another object is to provide gripping apparatus which includes a pair of opposed rotary members which are spaced at a predetermined interval and adapted frictionally to engage an elongated article as it passes therebetween through the interval.

A further object is to provide a pulling device for retrieving lengths of fishing line and the like which is capable of engaging the line at any portion intermediate the ends, as well as being releasable at any time during or following the retrieval.

These, together with other objects, will become more fully apparent upon reference to the following description and accompanying drawing.

In the drawings:

FIG. 4 is a fragmentary, enlarged view in horizontal longitudinal section taken on line 4—4 of FIG. 2.

FIG. 5 is a vertical, transverse section taken in a plane represented by the arrows 5—5 of FIG. 4.

FIG. 6 is a top plan view of one of the rotary members of the device incorporating resilient biasing means as a modification of the pulling device shown in FIG. 4.

FIG. 7 is a fragmentary view in side elevation of the device showing the release means in two positions of operation, the released position being shown in dashed lines.

Figures 1, 2, 3:
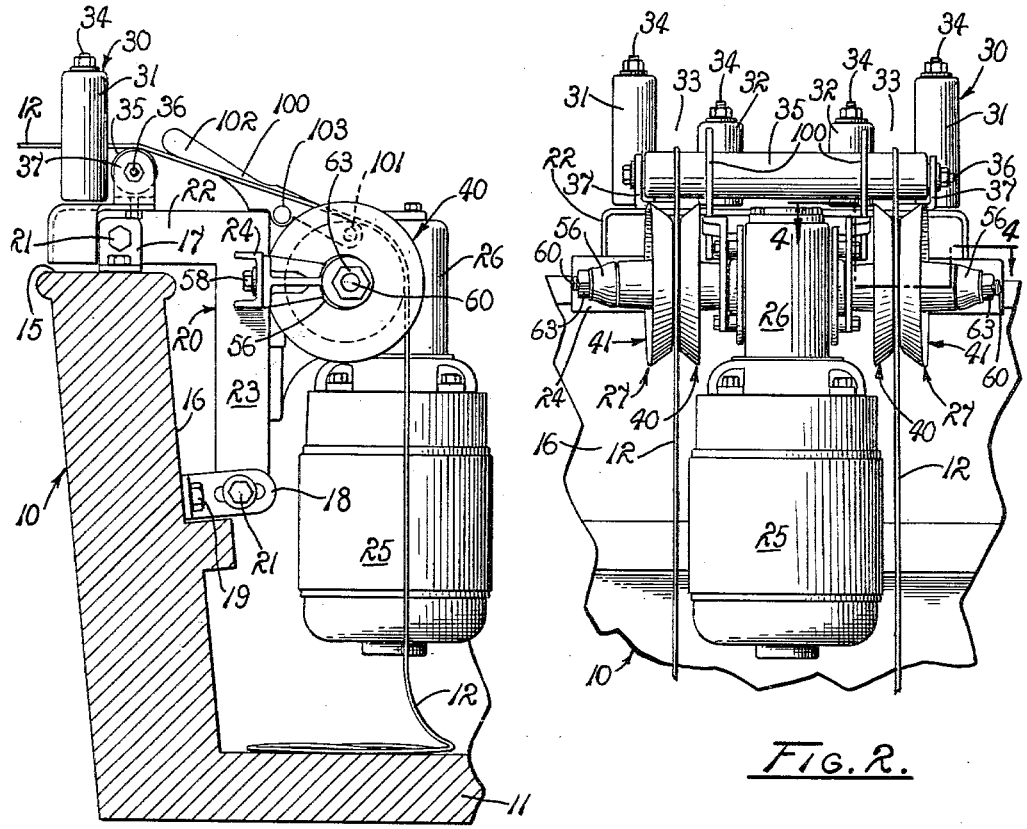
FIG. 1 is a side elevation of the pulling apparatus embodying the principles of the present invention shown in an operative position mounted on the transom of a boat which is shown in section.
FIG. 2 is a front elevational view of the apparatus shown in FIG. 1 and showing two such pulling devices powered by a single motor.
FIG. 3 is a top plan view of the apparatus of FIG. 2.

Referring to FIG. 1 of the drawings, a supporting member for the device is illustrated as the transom 10 or a side rail of a fishing boat, not otherwise shown. A deck 11 is illustrated as a depository for a fishing line 12 to be retrieved by the present device. The invention is described in connection with its use in commercial deep-sea fishing operations as a specific example of utility. The line 12 is of any suitable diameter and length according to the type of fish being sought. In albacore fishing, the line is of two hundred pound test quality and approximately one-eighth of an inch in diameter. A barbless hook-type feathered lure, not shown, is secured to one end of the line and is either trailed directly to the stern of the boat during trolling, or, by an appropriate bridle, held in an elevated, laterally projecting position by means of suitable outrigger poles, not shown. The foregoing is merely illustrative of a typical operational environment for the device of the present invention and actually forms no part of the invention.

The transom 10 provides an upper mounting surface 15 and a side wall mounting surface 16 to which are secured respectively mounting lugs 17 and 18 by means of lag screws 19. The pulling device includes a mounting base, generally indicated at 20, secured to the mounting lugs 17 and 18 by means of bolts 21. The base comprises an upper portion 22 and an angularly related depending wall portion 23. An elongated channel arm 24 is laterally extended from both sides of the wall portion 23. A motor 25 is dependingly secured to a speed reducer 26 bolted to the base 20. The speed reducer includes reduction gears, not shown, incorporating a suitable right-angled drive train to a pair of laterally opposed puller units 27 mounted in driving relationship to the motor 25. The details of the power train are not necessary for an understanding of the invention. However it is to be observed that by the power train, not shown, each of the puller units is adapted to rotate in a clockwise direction as viewed in FIG. 1, to retrieve their respective lines shown at 12.

A primary line guiding assembly 30 is associated with the puller units 27. For each puller unit, a pair of vertically oriented rollers 31 and 32 are spaced a predetermined distance to define a passageway 33 therebetween which constitutes an entry throat for the line 12. Each of the rollers 31 and 32 is rotatably mounted on a spindle, indicated at 34, to permit independent functioning in the same manner as deflector sheaves, or rollers, in fair-leads associated with conventional cable winding mechanisms. A horizontally disposed guide roller 35 is rotatably mounted by means of a spindle 36 supported in laterally opposed upright lugs 37 projecting from the base 20. The rollers 31, 32 and 35 are provided to facilitate entry of the line 12 into the respective puller units 27 without fouling of the line during retrieval operations.

Each of the puller units comprises an opposed pair of rotary members 40 and 41, and in the form illustrated in the drawings, the member 40 is the driving element of the pair while the member 41 is the driven element. The details of the driving element 40 may be best seen in FIG. 4. This element includes an axially extended hub 42 having a bore 43 adapted to receive a drive shaft 44. It is to be understood that the drive shaft 44 is powered for rotation by the motor 25 through reduction gears and a right-angle drive of a power train, not shown in detail, and enclosed in the speed reducer housing 26. The driving member 40 is non-rotatably secured to the drive shaft 44 by means of a key 45 received in suitable keyways provided in the hub and the shaft and retained in an operating, locked position by means of a setscrew 46.

A circular web 50 extends radially from the hub 42 and carries a substantially cylindrical, axially extended flange 51 which constitutes a stop to limit the radial movement of the line 12 when being retrieved by the puller unit 27. A gripping surface 52 radially extends circumferentially of the flange 51 and is immediately adjacent to an outwardly flared flange 53 having a guiding surface 54 sloping toward the gripping surface 52. A plurality of drive lugs 55 are circumferentially spaced at uniform radial distances about the hub 42 and constitute driving means for the driven member 41.

An outboard support bracket 56 is adjustably mounted on the channel arm 24 for selective axial positioning of the bracket relative to the member 40. The adjustable connection is for the purpose of selectively positioning the driven member 41 relative to the drive member 40 and includes elongated holes 57 in the channel arm 24 through which are passed connecting capscrews 58 used in mounting the bracket 56. As will be evident subsequently this adjustable mounting permits selective frictional engagement of the line 12 by each puller unit 27, as well as adaptation of the units to lines of various diameters.

An idler shaft 60 is non-rotatably mounted in a bore 61 provided in the bracket 56 and axially positioned by means of a shoulder 62 engaging the bracket and a retaining nut 63. A key 64 received in suitable keyways provided in the bracket and the shaft complete the non-rotatable connection between these two members.

The driven rotary member 41 comprises a hub 65 having an axially extended bore 66 in which are received a pair of bearings 67 mounted on the shaft 60 to provide an axis of rotation for the member 41. In a commercial embodiment of the present invention, the axis of rotation of the member 41 is axially misaligned by 3° for purposes which will be subsequently discussed. An oil seal 68 positioned in the bore 66 at one end thereof in conjunction with a cover 69 and a gasket 70 secured to the hub by means of capscrews 71 form a closed oil chamber 72. An oil filler cap 73 is provided in the hub to permit addition of a suitable lubricant to chamber 72. A circular web 80 is radially extended from the hub 65 and carries an annular axially extended flange 81 which is spaced from the hub at a slightly greater radial distance than the flange 51 from its axis. This construction permits the flange 51 to be received within the flange 81 in the operating position shown in FIG. 4. A gripping surface 82 radially extends circumferentially of the flange 81 and is provided with an outwardly flared flange 83 carrying a guide surface 84. A plurality of drive lugs 85, similar to the drive lugs 55, are circumferentially spaced about the web 80 and are adapted to form a driving connection with the lugs 55. It should be noted that the gripping surfaces 52 and 82 are spaced at a predetermined interval 86 which is of non-uniform axial dimensions throughout the circumferential extent of this interval. The guide surfaces 54 and 84 of the respective flanges 53 and 83 define an entry throat, indicated at 87, for the line 12, and constitute secondary line guiding means for their respective puller units 27.

A modified form of one of the rotary members is shown in FIG. 6, and in this form the member 41 is urged toward the driven member 40 by means of a coiled spring 90 encircling the shaft 60. At the left end of the spring 90, as viewed in FIG. 6, a thrust washer 91 is interposed between the hub 65 and the spring. A piloting shoulder 92 is provided at the right end of the spring to center the same on the shaft 60 and to serve as a reaction member to transmit the biasing force of the spring in urging the driven member 41 towards the driving member 40.

The details of a line release means may be seen by referring to FIGS. 1, 2 and 7, wherein a lever 100 is supported on the speed reducer housing 26 by means of a pivotal mounting 101. The lever is provided with an operating handle 102 and carries a clearing roller 103 intermediate the handle and the pivotal mounting 101. The lever 100 is axially offset relative to the puller unit entry throat 87 while the roller 103, rotatably mounted on the lever, bridges the threat and the interval of spacing 86 to engage the line 12 upon movement of the lever 100 to a line releasing position shown in dashed lines in FIG. 7.

*Operation*

The operation of the described embodiments of the subject invention is believed to be readily apparent and is briefly summarized at this point. Upon desiring to retrieve an elongated flexible member, such as the line 12, the release lever 100 is positioned as shown in FIG. 1. Assuming that the line 12 is employed in deep-sea fishing operations and a fish is to be landed upon retrieval of the line 12, any intermediate portion of the line is guided into the interval of spacing 86 through the entry throat 87 of the puller unit 27. The motor 25 is used to motivate the driving member 40 in a clockwise direction, as viewed in FIG. 1. Through the interconnection of the drive lugs 55 and 85, the driven member 41 is rotated at a rate to provide substantially identical peripheral speeds for the gripping surfaces 52 and 82. Upon being guided into the interval 86, the line 12 is drawn into the position shown in FIG. 1, wherein the axial spacing of the gripping surfaces 52 and 82 at its minimum dimension is slightly less than the diameter of the line. These gripping surfaces frictionally engage the line to grip it between the members 40 and 41 and to exert a force in tension thereon sufficient to retrieve the line and the catch. By means of the adjustable mounting comprising the elongated holes 57 in the channel arm 24 and the bolts 58 securing the outboard mounting bracket 56 thereto, the interval of spacing 86 between the gripping surfaces 52 and 82 can be selectively adjusted to adapt a puller unit for any given line diameter. In the event that the article to be drawn through the puller unit is not radially symmetrical, the interval 86 can be adjusted to conform to a selected transverse dimension of the article.

Upon retrieval of a sufficient length of line to permit landing of the fish by conventional means, the lure, not shown, is removed and dropped overboard so that it may be trailed to the rear of the boat at a desired trolling position. To permit the return to the water of the accumulated line previously deposited in a random pattern in the bottom of the boat during its retrieval, the release lever 100 is moved to the position shown in dashed lines in FIG. 7. This lever movement forcibly ejects the line 12 from between the gripping surfaces 52 and 82. The release lever can be operated at any time, regardless of whether the puller unit 27 is being rotated by means of the motor 25. If the interval of spacing 86 is such in relation to the line diameter that the line 12 is being compressed tightly between these surfaces, the release lever 100 is much more effective when operated during rotation of the puller unit.

Upon release of the line 12 from between the rotary members 40 and 41, the light drag of the lure and the line in the water is sufficient to trail the previously retrieved portion of the line back into the water. It is to be noted that the puller unit is quite effective in retrieving the line and to exert a force in tension on the line of a magnitude sufficient for the purpose. Yet, upon release of the line by operation of the lever 100, the puller unit offers absolutely no resistance to the line being returned to a trolling position. Accordingly, the invention provides a line pulling apparatus adapted for use with lines of various diameters and is adjustable to exert a desired force in tension on the line by frictional engagement thereof. The primary and secondary line guiding means insure effective retrieval of the line 12, while the release lever 100 is capable of immediate ejection of the line which permits an unresisted movement thereof in a direction opposite to the line of action of the tension force previously exerted thereon.

Although the invention has been described in connection with line retrieval in commercial deep-sea fishing, devices embodying the principles of the invention have utility in other environments wherein it is desired to draw an article through the interval 86 by means of frictional engagement between the gripping surfaces 52 and 82. Such devices are effective to grip, by exerting an axially directed compressive force, to transport by reason of the rotation of the members, and subsequently to release or to discharge an article being supplied thereto. The embodiment fragmentarily shown in FIG. 4 is particularly useful in performing such functions wherein the articles being supplied to the device are of sizes varying throughout a predetermined range of axial dimensions for the interval 86. The spring 90 is selected to provide an axial force urging the member 41 toward the member 40. The adjustable mounting of the bracket 56, which permits selective positioning of the member 41, in conjunction with the spring 90, adapts the device to exert a predetermined axial force over and axial range of the interval 86 coincident with the aforesaid predetermined range. This force may be used in gauging operations, crushing articles, or in providing the force necessary for the surfaces 52 and 82 to effect frictional engagement with the article in transporting the article throughout the circumferential extent of the minimum axial dimension of the interval 86. Upon transporting such an article through this circumferential extent, the article is released in the same manner as the line 12 illustrated in the drawings and described in connection with line retrieval. Accordingly, the invention provides a device capable of gripping, transporting and releasing articles of predetermined dimensions and is not necessarily limited to the drawing or pulling of a flexible, elongated article such as the line 12.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A line pulling apparatus comprising a pair of opposed rotary members; means mounting each of said members for rotation about a respective axis, said axes of rotation being endwardly adjacent and slightly angularly related, each of said members having a hub, a web radially extended from the hub and carrying a circumferential gripping surface generated about the respective axis of each member and being concentric therewith a plane substantially normal to the members' respective axes, said mounting means including means adapted selectively to maintain the gripping surfaces of the respective members in opposed axially spaced relationship to define an interval therebetween of the graduated axial dimension circumferentially thereabout, a circumferential portion of said interval being at a predetermined minimum dimension to receive therein a line of predetermined diameter which is frictionally engaged by said surfaces; drive means for rotating said members about their respective axes in the same direction of rotation to effect substantially equal peripheral speeds of said gripping surfaces; and guide means radially spaced from said gripping surfaces to facilitate entry of the line therebetween wherein release means is operatively associated with said mounting means and is selectively operabe to effect radial movement of the line from between the gripping surfaces.

2. A line pulling apparatus comprising a mounting base; a pair of opposed rotary members; means carried by the base mounting one of said members about an axis of rotation, said means including a motor, a speed reducer housing supporting the motor, a power shaft extending from the housing to define the axis of rotation for said members, and means non-rotatably securing said one member to the power shaft, each of said rotary members having a hub, a web radially extended from the hub, an axially extended flange directed toward the opposite member, a circumferential gripping surface generated about the respective axis concentrically therewith and being at a radial distance slightly greater than said axially extended flange, a flared flange extended from the web in outwardly divergent opposed relationship to the flange of the other member, and drive lugs axially extended from the web and arranged to mesh with the lugs of the other member; means mounting the other rotary member for rotatoin about a respective axis, said means being axially adjustable relative to said first member to dispose said gripping surfaces at a predetermined interval of axial spacing to receive a flexible line therebetween, said axis of rotation of the other member being angularly related to the axis of rotation of said first member; a pair of cylindrical guide members radially spaced from said gripping surfaces and mounted on the base at a predetermined axial spacing relative to the rotary members to define an entry throat substantially radially aligned with the interval of spacing between said gripping surfaces; and a lever pivotally mounted on the housing and carrying an axially extending release roller bridging said interval and adapted to eject the line from between said gripping surfaces upon pivotal movement of the lever to effect radial outward movement of the roller.

3. The line pulling apparatus of claim 2 wherein said axial misalignment is approximately 3°.

References Cited by the Examiner

UNITED STATES PATENTS

| 572,399 | 12/96 | Atwood | 254—138 |
| 1,380,655 | 6/21 | Larson | 254—137 |
| 1,928,117 | 9/33 | Stewart | 254—138 |
| 2,541,766 | 2/51 | Jereb | 74—230.24 |
| 2,725,756 | 12/55 | Nelson | 74—230.24 |

FOREIGN PATENTS 670,661  1/39  Germany.

SAMUEL F. COLEMAN, *Primary Examiner.*